(12) United States Patent
Grigsby, Jr.

(10) Patent No.: US 6,552,121 B2
(45) Date of Patent: Apr. 22, 2003

(54) ALKALI SILICATE-POLYISOCYANATE COMPOSITES

(75) Inventor: Robert Allison Grigsby, Jr., Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 10/015,064

(22) Filed: Dec. 11, 2001

(65) Prior Publication Data

US 2002/0120061 A1 Aug. 29, 2002

Related U.S. Application Data

(63) Continuation-in-part of application No. 09/640,224, filed on Aug. 16, 2000, now abandoned.

(51) Int. Cl.$^7$ .............................. C08K 3/34; C08K 3/10; C09K 3/10; C08G 18/00; C08L 75/02
(52) U.S. Cl. ...................... 524/791; 523/130; 528/44; 528/57
(58) Field of Search ...................... 523/130; 524/791; 528/44, 57

(56) References Cited

U.S. PATENT DOCUMENTS

| | | | |
|---|---|---|---|
| 4,146,509 A | 3/1979 | Markusch et al. | 521/115 |
| RE31,946 E | 7/1985 | Meyer et al. | 405/264 |
| 4,669,919 A | 6/1987 | Hilterhaus et al. | 405/264 |
| 4,827,005 A | 5/1989 | Hilterhaus | 556/414 |
| 4,920,155 A | 4/1990 | Bode | 521/154 |
| 5,093,416 A | 3/1992 | Blount | 525/61 |

FOREIGN PATENT DOCUMENTS

| | | |
|---|---|---|
| EP | 0 056 145 A1 | 7/1982 |
| WO | WO 93/21249 | 4/1992 |

*Primary Examiner*—Rabon Sergent
(74) *Attorney, Agent, or Firm*—Russ R. Stolle; Ron D. Brown; Christopher J. Whewell

(57) ABSTRACT

A process for preparing alkali silicate—polyisocyanate composites without catalyst separation. The process involves blending a catalyst and a polyisocyanate to form a first component, and blending an alkali silicate and water to form a second component. The first and second components are then mixed together to form a reactive mixture that reacts to form a hardened composite. The progression of the reaction proceeds without excessive foaming, high exotherms, or the release of an offensive odor. Sodium silicate—polyisocyanate composites prepared according to the above process, and a process for using the alkali silicate—polyisocyanate composites to consolidate and seal various types of formations in mining, tunneling, and other construction projects are also disclosed. Any void volume which is capable of receiving a flowable precursor of a composite formulation according to the invention prior to its cure is suitable for treatment according to the present invention.

20 Claims, 1 Drawing Sheet

— Example 1
— Example 2

ALKALI SILICATE-POLYISOCYANATE COMPOSITES

CROSS-REFERENCES TO RELATED APPLICATIONS

This Application is a continuation-in-part of U.S. application Ser. No. 09/640,224 which was filed on Aug. 16, 2000 and is now abandoned, the entire contents of which are herein incorporated by reference thereto.

TECHNICAL FIELD

This invention relates to alkali silicate—polyisocyanate composites, and, more particularly, to a process for preparing alkali silicate—polyisocyanate composites that proceeds without catalyst separation.

BACKGROUND OF THE INVENTION

Alkali silicate—polyisocyanate composites are frequently used in mining, tunneling, and related construction projects to consolidate and seal various types of formations, which generally comprise a void volume that is capable of receiving a curable composition that exists in a flowable state prior to its curing. The conventional method of preparing alkali silicate—polyisocyanate composites involves mixing a first component, which typically comprises an alkali silicate, water, and a catalyst, with a second component, which typically comprises a polyisocyanate. After the first and second components are mixed together, the reaction proceeds to form a hardened composite according to the following reaction scheme:

(1) Upon mixing, the reaction begins when some of the polyisocyanate reacts with the water to produce polyurea and gaseous carbon dioxide.

(2) Next, the in-situ formed carbon dioxide reacts instantaneously with the $A_2O$ portion of the alkali silicate to produce $A2CO3 \times H2O$ (where A represents an alkali metal), while the $Si_2O$ portion of the alkali silicate reacts to form polysilicic acid.

(3) As the reaction progresses, heat is released, and the remaining polyisocyanate is trimerized.

The conventional method described above has one inherent defect. In particular, the high density of the alkali silicate tends to cause the catalyst to separate out from the alkali silicate-water-catalyst mixture and float on the top of the mixture. To minimize catalyst separation, the mixture may be mixed immediately prior to use. However, this may be difficult to do in confined areas where this mixture is often used. In addition, because catalyst separation reduces the activity of the catalyst, it is difficult to determine how much catalyst needs to be added to the reactive mixture. To counteract this problem, a surfactant may be added to the alkali silicate-water-catalyst component to keep the catalyst in solution. However, the addition of a surfactant tends to cause excessive foaming in the reaction system, thereby reducing the physical properties of the resulting composite.

While catalyst separation is the predominate problem associated with preparing alkali silicate-polyisocyanate composites, several other factors must be considered when preparing such composites. For example, the catalyst used in the preparation of the composite must not contribute to the generation of an excessive amount of carbon dioxide. The generation of an excessive amount of carbon dioxide tends to cause foaming, thereby reducing the physical properties of the resulting composite. Additionally, because alkali silicate—polyisocyanate composites are frequently prepared and used in confined spaces, the exotherm for the reaction preferably should not exceed about 100° C. For the same reason, it is also preferable for the reaction to proceed without giving off an offensive odor.

Therefore, what is needed is a process for preparing alkali silicate—polyisocyanate composites that proceeds without catalyst separation, excessive foaming, high exotherms, or the release of an offensive odor.

SUMMARY OF THE INVENTION

The present invention provides for a process of preparing sodium silicate—polyisocyanate composites that proceeds without catalyst separation, excessive foaming, high exotherms, or the release of an offensive odor. To overcome deficiencies in the prior art, the present invention takes the novel approach of incorporating the catalyst into the polyisocyanate component, instead of incorporating the catalyst into the alkali silicate-water component. Incorporation of the catalyst into the polyisocyanate component prevents separation of the catalysts in the reaction mixture.

More particularly, the process of the present invention involves blending a catalyst and a polyisocyanate to form a first component, and blending an alkali silicate and water to form a second component. After blending, the first and second components are then mixed together to form a reactive mixture that reacts to form a hardened composite.

Further, the present invention also provides for sodium silicate—polyisocyanate composites that are prepared by blending a catalyst and a polyisocyanate to form a first component, and blending an alkali silicate and water to form a second component. After blending, the first and second components are then mixed together to form a reactive mixture that reacts to form a hardened composite.

In addition, the present invention also includes a process for consolidating and sealing various types of formations or void volumes in mining, tunneling, and related construction projects. This process involves blending a catalyst and a polyisocyanate to form a first component, and blending an alkali silicate and water to form a second component. After blending, the first and second components are then mixed together to form a reactive mixture. This reactive mixture is then introduced into a formation or void volume, and allowed to react to form a hardened composite that consolidates and/or seals the formation or void volume.

DETAILED DESCRIPTION

Figure 1:
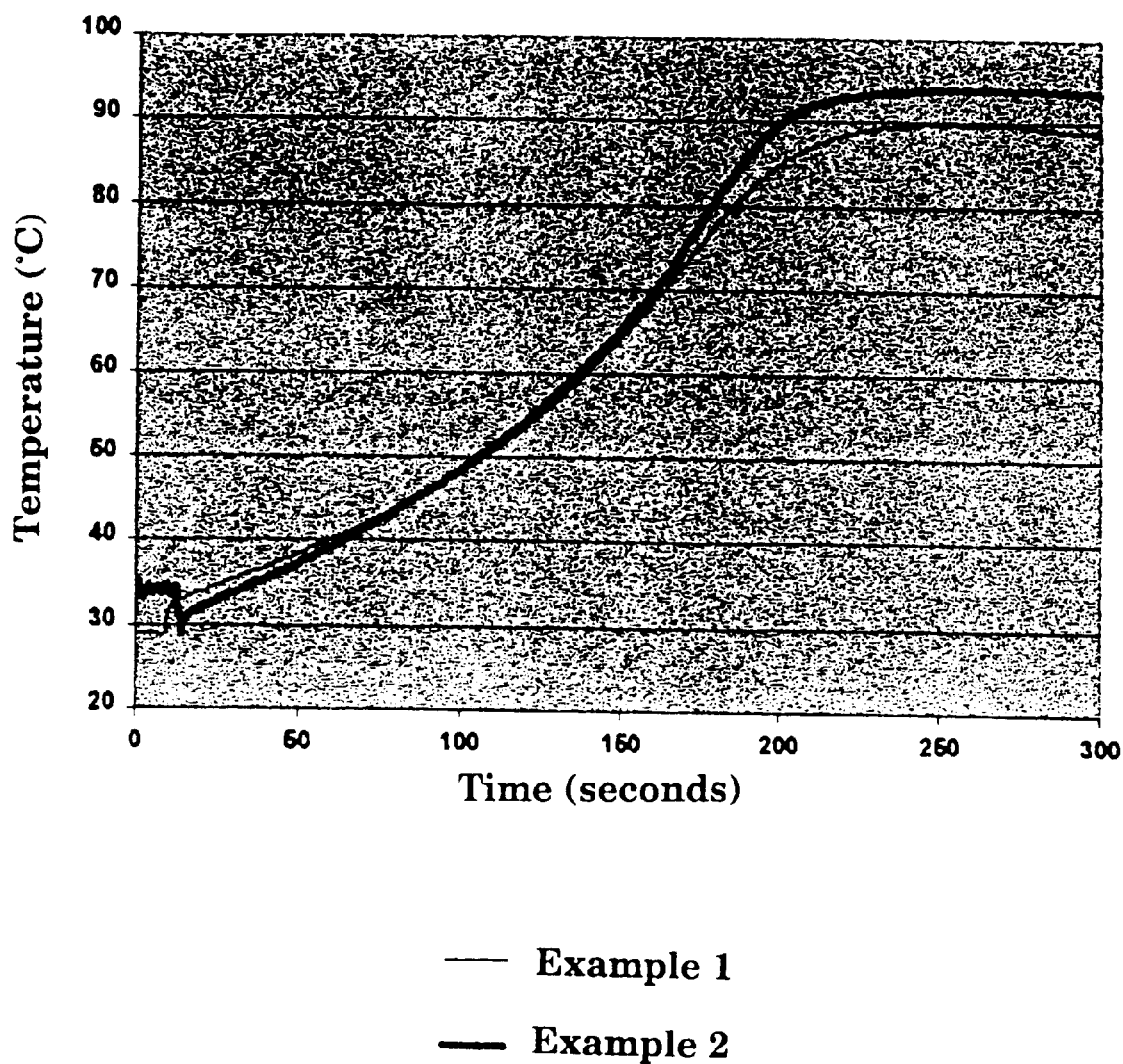
FIG. 1—is a graph showing a temperature profile of a reaction system according to the invention as a function of time.

In one embodiment, the present invention provides for a process of preparing sodium silicate—polyisocyanate composites. This process involves blending a catalyst and a polyisocyanate to form a first component, and blending an alkali silicate and water to form a second component. The first and second components are then mixed together to form a reactive mixture that reacts to form a hardened composite. Advantageously, the process of the present invention proceeds without catalyst separation. In a process of the invention, the first component has a pH of at least 7.5.

In another embodiment, the present invention provides for sodium silicate—polyisocyanate composites that are prepared by blending a catalyst and a polyisocyanate to form a first component, and blending an alkali silicate and water to form a second component. After blending, the first and second components are then mixed together to form a reactive mixture that reacts to form a hardened composite.

In yet another embodiment of the present invention, the composites prepared according to the present invention may be used to consolidate and/or seal various types of formations in mining, tunneling, and related construction projects, including cracks, holes, crevasses, fissures, and other void volumes of the like. In this embodiment, a catalyst and a polyisocyanate are blended to form a first component, and an alkali silicate and water are blended to form a second component. After blending, the first and second components are then mixed together to form a reactive mixture. This reactive mixture is then introduced into a formation or void volume, and allowed to react to form a hardened composite that consolidates and/or seals the formation or void volume.

The catalyst used in the present invention may comprise any number of conventionally available catalysts that are stable in polyisocyanates and promote the reaction of the polyisocyanate component with the alkali silicate and water component. Preferably, the catalysts comprises an amine catalyst that has a relatively low activity, does not cause the exotherm for the reaction to exceed about 100° C., does not contribute to the production of a strong odor, or cause the production of an excessive amount of carbon dioxide. Most preferably, the catalyst comprises JEFFCAT® DMDEE (2,2'-dimorpholinodiethylether) (commercially available from the Huntsman Corporation, Houston, Tex.). Advantageously, JEFFCAT® DMDEE is stable in polyisocyanates, promotes the reaction of the polyisocyanate component with the alkali silicate and water component, does not cause excessive foaming, high exotherms, or the release of an offensive odor.

I have discovered that JEFFCAT® DMDEE (2,2'-dimorpholinodiethylether) is a catalyst which is particularly advantageous for preparing alkali silicate—polyisocyanate composites because it forms mixtures with isocyanates which are stable over the long term, and does not require a pH adjustment as the prior art so requires (see U.S. Pat. No. 4,416,509; col. 15, lines 58–63) for so many other catalyst candidates taught in the prior art (ibid., col. 8, line 20 et seq.). In addition, 2,2'-dimorpholinodiethylether is phase compatible with the other components of the composite, and does not separate from the mixture as is the case for prior art catalysts which require constant agitation of the reactive components to maintain homogeneity, which is especially difficult owing to the high viscosity of the precursor materials. Finally, since JEFFCAT® DMDEE is a relatively weak catalyst, the level of foaming in the reactive mixture is readily minimized because small variances in the amount used do not have a drastic effect on the reaction profile as do other, prior art catalysts. This provides a wide window of operability which makes the system somewhat forgiving to small inadvertent variations in the amount of catalyst used, which variances in prior art systems would mean a change of the magnitude of day and night difference in reaction profile, foaming, and the properties of the finished composites. Thus, when using JEFFCAT® DMDEE, one is able to readily achieve optimum performance.

The polyisocyanate used in the present invention may comprise any number of polyisocyanates, including, but not limited to, toluene diisocyanates (TDI), diphenylmethane diisocyanate (MDI)—type isocyanates, and prepolymers of these isocyanates. Preferably, the polyisocyanate component has at least two aromatic rings in its structure, and is a liquid product. Polymeric isocyanates having a functionality greater than about two are preferred. More preferably, the polyisocyanate component comprises Rubinate® M, a polymeric diphenylmethane diisocyanate (commercially available from Huntsman ICI Chemicals, LLC, Geismar, La).

The alkali silicate used in the present invention may comprise any number of alkali silicates, including, but not limited to, sodium silicate and potassium silicate. Preferably, the alkali silicate comprises sodium silicate with a $SiO_2$: $Na_2O$ weight ratio from about 1.60 to about 3.22. More preferably, the sodium silicate has a $SiO_2$: $Na_2O$ weight ratio from about 2.0 to about 3.0.

The following examples are illustrative of the present invention, and are not intended to limit the scope of the invention in any way.

Example 1 (Comparative)

62.7 grams of Sodium Silicate M (commercially available from the PQ Corporation, Valley Forge, Pa.), with a weight ration of $SiO_2/Na_2O$=2.58, 49.3 Be', 2.31 grams of water, and 0.90 grams of DABCO® DMP-30 (commercially available from Air Products and Chemicals, Inc., Allentown, Pa.) were mixed in a paper cup. Then, 46.05 grams of Rubinate® M were quickly added to the sodium silicate-water-catalyst mixture, as the mixture was stirred with a tongue depressor. The mixture was then poured into a cylindrical plastic container, and stirring was continued. After the material exothermed, the mixture was allowed to cool to room temperature. The plastic container was then peeled away from the resulting solid composite. The solid composite was then placed in a humidity cabinet for three days. After three days, the composite was crushed in an Instron tester to determine its physical properties.

Example 2

62.7 grams of Sodium Silicate M and 2.31 grams of water were mixed in a paper cup. 46.05 grams of Rubinate® M and 0.56 grams of JEFFCAT® DMDEE were mixed in a second paper cup. The isocyanate-catalyst component was then quickly added to the sodium silicate-water component, and the reaction components were stirred with a tongue depressor. The reaction components were then transferred to a cylindrical plastic container, and stirring was continued. After the material exothermed, the material was allowed to cool to room temperature. During the preparation of the composite, no catalyst separation was observed. In addition, the excessive production of carbon dioxide, and the release of a strong odor was also not observed. The plastic container was then peeled away from the resulting solid composite. The solid composite was then placed in a humidity cabinet for three days. After three days, the composite was crushed in an Instron tester to determine its physical properties.

The results of the Instron testing for the composites made in Examples 1 and 2 are summarized in Table 1.

TABLE 1

|  | Composite from Example 1 (Comparative) | Composite from Example 2 |
|---|---|---|
| Modulus (10–50% yield stress), psi | 62150 | 58700 |
| Yield Stress, psi | 3300 | 3460 |
| % strain at Yield, % | 8.5 | 8.5 |
| Stress at Max. Load, psi | 6000 | 6150 |
| Percent Strain at Max. Load | 22.5 | 20.1 |

Table 1 shows that the physical properties of the composite prepared according to the present invention (Example 2) are comparable to the physical properties of the composite prepared according to conventional methods known in the art (Example 1). This result demonstrates that the incorporation of the catalyst into the polyisocyanate does not adversely alter the physical properties of the resulting composite.

Example 3

In order to monitor the temperature of the reaction systems described in Examples 1 and 2, an additional composite sample was prepared for each reaction system, using the same methods disclosed above, except that only one-third of each of the reaction components was used. The temperature of the reaction systems was monitored by a thermocouple, beginning at the time of mixing, and ending shortly after the reaction systems had exothermed. The temperature data was then graphed to show the temperature profile for each of the reaction systems. (FIG. 1)

FIG. 1 shows that the temperature profile of the reaction system prepared according to the present invention (Example 2) is comparable to the temperature profile of the reaction system prepared according to conventional methods known in the art (Example 1). This result shows that the incorporation of the catalyst into the polyisocyanate does not adversely alter the progression of the reaction, or produce undesirably high exotherms. The temperature profile for the reaction system prepared according to the present invention (Example 2) shows that the exotherm for the reaction was less than 100° C.

Although illustrative embodiments have been shown and described, a wide range of modification, changes, and substitution is contemplated in the foregoing disclosure. In some instances, some features of the disclosed embodiments may be employed without a corresponding use of the other features. Accordingly, it is appropriate that the appended claims be construed broadly and in a manner consistent with the scope of the invention.

What is claimed is:

1. A process for preparing alkali silicate—polyisocyanate composites comprising the steps of:
    a) mixing a catalyst with a polyisocyanate to form a first component, wherein said first component has a pH of at least 7.5;
    b) mixing an alkali silicate with water to form a second component; and
    c) mixing the first and second component to form a reactive mixture that reacts to form a hardened composite,
        wherein the catalyst comprises 2,2'-dimorpholinodiethylether.

2. The process of claim 1, wherein the alkali silicate comprises sodium silicate.

3. The process of claim 2, wherein the ratio of silicon to sodium present in the alkali silicate component is from about 1.6:1 to about 3.32:1 on a weight basis.

4. The process of claim 1, wherein the polyisocyanate comprises a polymeric diphenylmethane diisocyanate with a functionality greater than two.

5. The process of claim 1, wherein the exotherm for the reactive mixture is less than 100° C.

6. A process for preparing alkali silicate—polyisocyanate composites comprising the steps of:
    a) mixing a catalyst with a polyisocyanate to form a first component, wherein said first component has a pH of at least 7.5;
    b) mixing an alkali silicate with water to form a second component; and
    c) mixing the first and second component to form a reactive mixture that reacts to form a hardened composite,
        wherein said reactive mixture and said hardened composite are homogeneous, and wherein the catalyst comprises 2,2'-dimorpholinodiethylether.

7. The process of claim 6, wherein the alkali silicate comprises sodium silicate.

8. The process of claim 7, wherein the ratio of silicon to sodium present in the alkali silicate component is from about 1.6:1 to about 3.32:1 on a weight basis.

9. The process of claim 6, wherein the polyisocyanate comprises a polymeric diphenylmethane diisocyanate with a functionality greater than two.

10. The process of claim 6, wherein the exotherm for the reactive mixture is less than 100° C.

11. A process for filling a void volume comprising the steps of:
    a) mixing a catalyst with a polyisocyanate to form a first component, wherein said first component has a pH of at least 7.5;
    b) mixing an alkali silicate with water to form a second component;
    c) mixing the first and second component to form a reactive mixture; and
    d) introducing the reactive mixture into at least one of said void volumes, and allowing the reactive mixture to react to form a hardened composite,
        wherein the catalyst comprises 2,2'-dimorpholinodiethylether.

12. The process of claim 11, wherein the alkali silicate comprises sodium silicate.

13. The process of claim 12, wherein the ratio of silicon to sodium present in the alkali silicate component is from about 1.6:1 to about 3.32:1 on a weight basis.

14. The process of claim 11, wherein the polyisocyanate comprises a polymeric diphenylmethane diisocyanate with a functionality greater than two.

15. The process of claim 11, wherein the exotherm for the reactive mixture is less than 100° C.

16. An alkali silicate—polyisocyanate composite that is prepared by:
    a) mixing a catalyst with a polyisocyanate to form a first component, wherein said first component has a pH of at least 7.5;
    b) mixing an alkali silicate with water to form a second component; and
    c) mixing the first and second component to form a reactive mixture that reacts to form a hardened composite,
        wherein the catalyst comprises 2,2'-dimorpholinodiethylether.

17. The composite of claim 16, wherein the alkali silicate comprises sodium silicate.

18. The composite of claim 17, wherein the ratio of silicon to sodium present in the alkali silicate component is from about 1.6:1 to about 3.32:1 on a weight basis.

19. The composite of claim 16, wherein the polyisocyanate comprises a polymeric diphenylmethane diisocyanate with a functionality greater than two.

20. The composite of claim 16, wherein the exotherm for the reactive mixture is less than 100° C.

* * * * *